Jan. 8, 1946. J. T. FIESE 2,392,653
BRUSH DIVERTING APPARATUS FOR ROTARY SHREDDERS
Filed Aug. 3, 1943 2 Sheets-Sheet 1
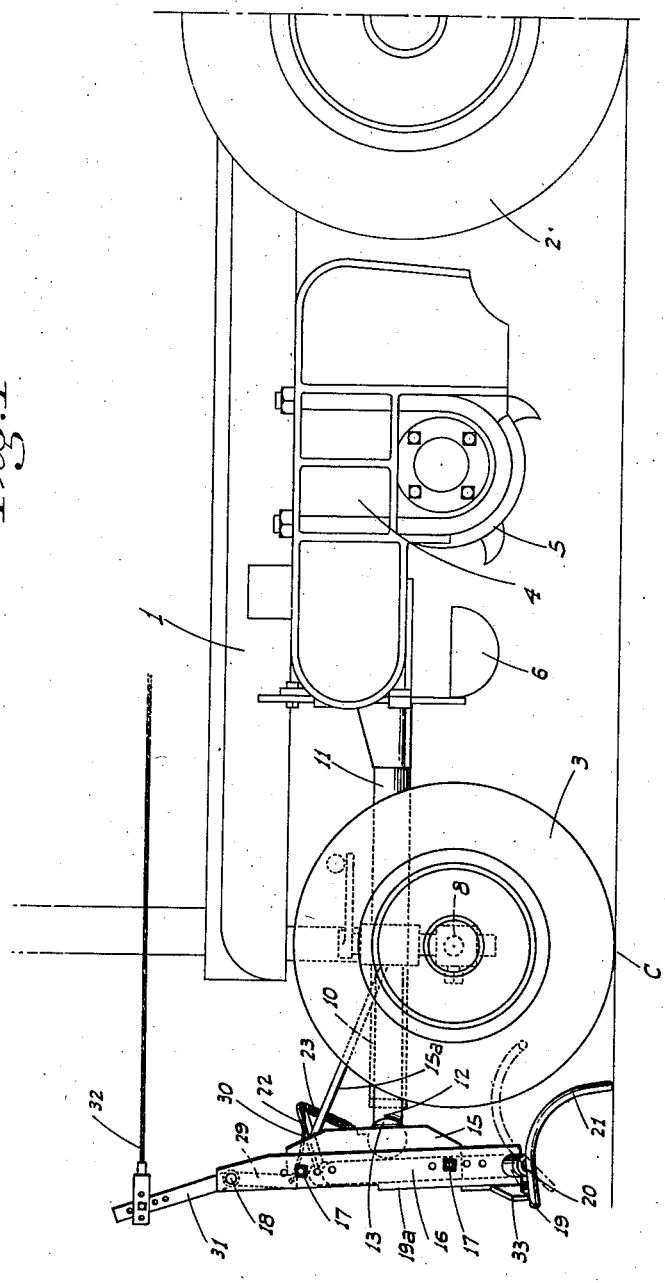
INVENTOR
J. T. Fiese
BY
ATTYS Jan. 8, 1946.  J. T. FIESE  2,392,653
BRUSH DIVERTING APPARATUS FOR ROTARY SHREDDERS
Filed Aug. 3, 1943  2 Sheets-Sheet 2
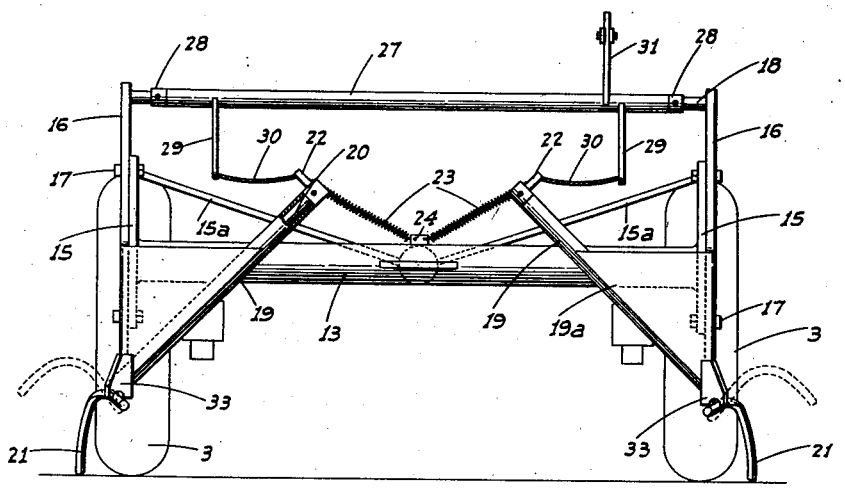
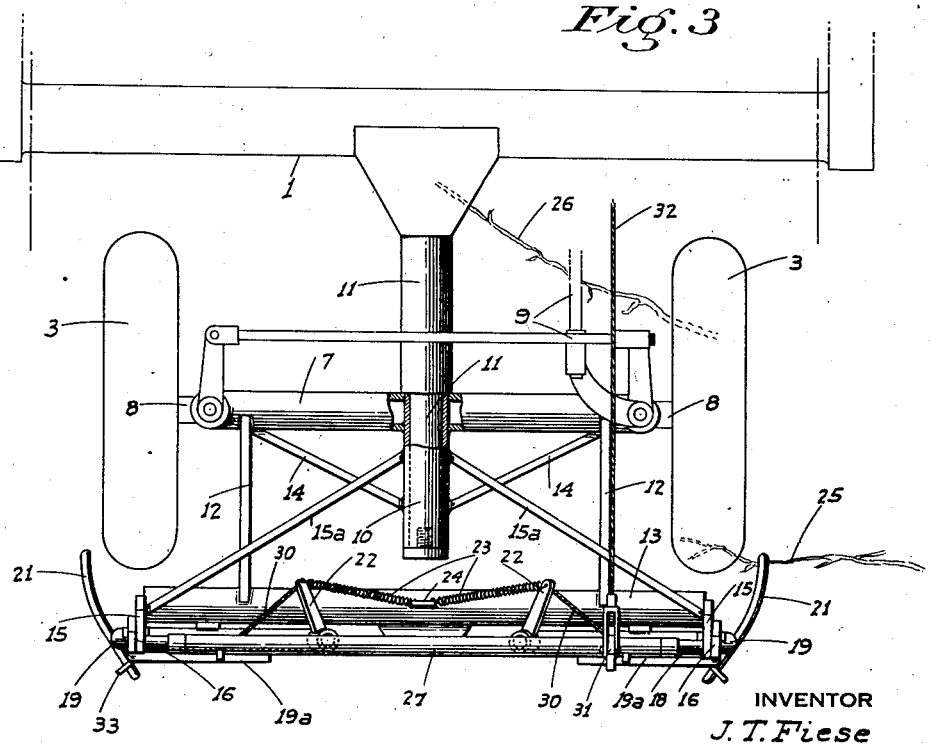
INVENTOR
J. T. Fiese Patented Jan. 8, 1946

2,392,653

UNITED STATES PATENT OFFICE 2,392,653

BRUSH DIVERTING APPARATUS FOR ROTARY SHREDDERS

Jesse T. Fiese, Fresno, Calif., assignor to Fiese and Firstenberger, Fresno, Calif., a copartnership Application August 3, 1943, Serial No. 497,163

12 Claims. (Cl. 55—118)

This invention relates in general to an attachment for a rotary shredder of the type adapted to move between the rows in an orchard or vineyard in straddling relation to rows of trimmings or brush cut from the trees or vines and placed on the ground for chopping or shredding into small pieces which provides desirable ground humus; the shredding machine including a wheel supported frame on which is mounted a power driven, transversely extending shredding rotor and shredding concave assembly. The shredding rotor is toothed, disposed relatively close to the ground, and of substantial length.

Heretofore in the operation of this type of machine those pieces of brush or twigs which were disposed on the ground laterally out from the brush row were likely to be missed by the shredding rotor, for the reason that not enough, if any, of these laterally extending twigs could be caught by the rotor teeth to effect drawing in and shredding of said twigs; the rotor being only of a length sufficient to embrace and projecting slightly beyond the sides of a brush row of predetermined width. To make the rotor longer so as to catch twigs extending laterally of the brush row proper is not feasible, as the width between the orchard or vineyard rows limits the length of rotor which may be employed.

It is therefore the principal object of this invention to provide novel apparatus mounted on the shredding machine ahead of the rotor to engage and divert laterally inward into the row those twigs which are initially disposed or extend beyond the sides of the brush row; the apparatus thus being effective to move such extending twigs into the path of the shredding rotor prior to passage of the latter.

Another object is to provide brush diverting apparatus, as above, which comprises, in combination with a pair of transversely spaced, brush row straddling front wheels which the machine includes, a brush diverting arm corresponding to each wheel and mounted to upstanding position with its lower end in ground engagement at a predetermined point laterally out and ahead of the point of contact of said wheel with the ground whereby upon advance of the machine and engagement of one of said arms with one of said laterally disposed or extending twigs intermediate the ends of the latter, said arm serves as a fulcrum about which said twig is diverted or flipped inwardly by the rotative action of the corresponding wheel as it rolls over the arm engaging twig.

A further object of the invention is to mount said brush diverting arms for movement between an operative position adjacent the wheels to an inoperative position clear of the wheels to permit relatively sharp steering or turning at the ends of the brush rows.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation, partly diagrammatic, of a brush shredding machine with the brush diverting apparatus thereon.

Figure 2 is a front view of the apparatus as mounted on a shredding machine.

Figure 3 is a plan view of the apparatus, partly in section, as mounted on a shredding machine.

Referring now more particularly to the characters of reference on the drawings, the brush shredding machine comprises generally a frame 1 supported above the ground by transversely spaced rear drive wheels 2 and transversely spaced front supporting wheels 3; said front wheels 3 being spaced apart a distance to closely straddle a row of brush to be shredded.

A toothed shredding rotor and shredding concave assembly, indicated generally at 4, is mounted transversely on and beneath frame 1 with the rotor 5 adjacent ground level; the rotor being of a length only slightly greater than the width of the row of brush the machine is adapted to straddle and shred. Brush deflectors 6, as shown in U. S. Patent No. 2,359,472, are disposed ahead of the rotor and serve to prevent brush and twigs from being thrown out of the machine from the ends of the rotor.

The front wheels 3 are mounted on the ends of a tubular axle 7 by vertically adjustable spindles 8, and are steered by a steering mechanism, indicated in part at 9. The axle 7 is formed centrally of its ends with a horizontal, longitudinally extending sleeve 10 through which a horizontal forwardly projecting post 11 extends in relative rotatable and sleeve supporting relation; the post being a part of main frame 1 and secured against escape from said sleeve.

Horizontal bars 12 are fixed at their rear ends on axle 7 adjacent its ends and project horizontally forward to a termination a short distance ahead of wheels 3, said bars being connected at their forward ends by means of a tubular horizontal cross arm 13 whose ends are directly ahead of said wheels, as shown. Suitable braces 14 connect diagonally between sleeve 10 and axle 7.

Vertically disposed, laterally facing attachment plates 15 are secured intermediate their ends to the ends of cross beam 13; and are also connected to sleeve 10 by braces 15a; and these plates vertically adjustably support the brush diverting apparatus which comprises the following structure:

Side plates 16 corresponding to but of greater length than attachment plates 15 are secured to the latter in vertically adjacent relation by bolts 17; the upper ends of plates 16 being connected by a cross rod 18. Elongated sleeves 19 extend through the lower ends of plates 16 and are secured in fixed relation thereto with only a short portion of said sleeves projecting out from the plates; said sleeves extending in a transverse direction at an upward and inward slope from their lower end portions, and terminate at their upper ends in a horizontal plane adjacent but below rod 18. Gusset plates 19a are mounted between plates 16 and sleeves 19.

Shafts 20 are axially immovably but rotatably mounted in the sleeves and project from both ends of the latter. A rearwardly and somewhat outwardly extending, downwardly curved arm or finger 21 is attached adjacent but short of its forward end on the lower end of each shaft 20, said arms being of such shape and configuration that their lower rear ends normally seat on the ground at a point a short distance ahead of, and slightly laterally out from, the point of contact, indicated at C, of wheels with the ground. These arms are retained in this position, when the machine is in operation, by means of radial levers 22 fixed on the upper ends of shafts 20 in rearwardly projecting and diverging relation to each other, and tension cords or springs 23 connected between said levers and an ear 24 on cross beam 13 centrally of its ends. The springs pull down on levers 22, urging shafts 20 in a direction tending to lower the arms 21, holding the latter in ground engagement.

As the machine advances in straddling relation over a row of trimmed twigs or brush, those twigs which are disposed or project laterally out from said row will be engaged intermediate their ends by the adjacent arm 21 as it advances, said arm then serving as a fulcrum about which the twigs are swung inwardly into the row by the rotative action of the adjacent wheel 3 as it rolls over said twigs inwardly of the point of engagement. As an illustration, a twig initially disposed laterally out from a brush row, as at 25, will be diverted, upon advance of the machine, to a position in the path of the rotor as at 26.

As the arms 21, when in use, are disposed relatively close to the wheels 3, means must be provided to rotate shafts 20 in a direction to swing the arms 21 to the position as indicated in dotted lines in Figs. 1 and 2 when said wheels 3 are to be turned sharply at the end of the row; such means comprising the following:

A relatively long sleeve 27 is rotatably mounted on rod 18 and held against axial movement by collars 28. Radial levers 29 are fixed on sleeve 27 and depend therefrom in corresponding relation to and ahead of levers 22 on the upper ends of shafts 20; levers 29 being disposed laterally out relative to corresponding levers 22, and pull cords 30 connecting adjacent ends of said corresponding levers 22 and 29. Another lever 31 upstands from sleeve 27 and is connected to a pull cable 32 leading back to a point adjacent the operator's station on the machine. A pull on cable 32 results, as will be obvious, in arms 21 being swung to their inoperative, out of the way position. To limit downward movement of the arms, stops 33 are secured on the lower ends of plates 16 and are engaged by the forward ends of said arms when the latter reach a predetermined position.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. Brush diverting apparatus for a shredding machine which includes a frame disposed above and for movement along the ground, a pair of transversely spaced wheels supporting the front of the frame and adapted to straddle a row of brush, and brush shredding mechanism mounted on the frame rearwardly of said wheels; said diverting apparatus comprising a pair of shafts extending transversely of the machine ahead of corresponding ones of said wheels, means mounting said shafts for rotation but preventing axial movement thereof, the laterally outermost ends of said shafts being adjacent the ground, brush engaging arms secured to and projecting rearwardly from said ends of the shafts, said arms being of a length and configuration so that when the shafts are in a given rotative position free end portions of the arms upstand from the ground laterally out relative to and in advance of the point of contact of corresponding wheels with the ground, and means to control rotation of the shafts; said last named means including spring elements operative to urge the shafts in a rotative direction to yieldably engage said free ends of the arms with the ground.

2. Brush diverting apparatus for a shredding machine which includes a frame disposed above and for movement along the ground, a pair of transversely spaced wheels supporting the front of the frame and adapted to straddle a row of brush, and brush shredding mechanism mounted on the frame rearwardly of said wheels; said diverting apparatus comprising a pair of shafts extending transversely of the machine ahead of corresponding ones of said wheels, means mounting said shafts for rotation but preventing axial movement thereof, the laterally outermost ends of said shafts being adjacent the ground, brush engaging arms secured to and projecting rearwardly from said ends of the shafts, said arms being of a length and configuration so that when the shafts are in a given rotative position free end portions of the arms upstand from the ground laterally out relative to and in advance of the point of contact of corresponding wheels with the ground, and means to control rotation of the shafts; said last named means including spring elements operative to urge the shafts in a rotative direction to yieldably engage said free ends of the arms with the ground, and manually controlled mechanism to rotate said shafts in an opposite direction.

3. Brush diverting apparatus for a shredding machine which includes a frame disposed above and for movement along the ground, a pair of transversely spaced wheels supporting the front of the frame and adapted to straddle a row of brush, and brush shredding mechanism mounted on the frame rearwardly of said wheels; said diverting apparatus comprising a pair of shafts extending transversely of the machine ahead of corresponding ones of said wheels, means mounting said shafts for rotation but preventing axial movement thereof, the laterally outermost ends of said shafts being adjacent the ground, brush engaging arms secured to and projecting rearwardly from said ends of the shafts, said arms having a lower end portion normally engaging and upstanding from the ground at a predetermined point ahead and laterally out from the point of ground contact of the corresponding wheel, and means to control rotation of said shafts; said shafts extending upwardly from said ends thereof in converging relation whereby to clear a row of brush over which the machine is straddled.

4. Brush diverting apparatus for a shredding machine which includes a frame disposed above and for movement along the ground, a pair of transversely spaced wheels supporting the front of the frame and adapted to straddle a row of brush, and brush shredding mechanism mounted on the frame rearwardly of said wheels; said diverting apparatus comprising a cross beam mounted in connection with the frame ahead of said wheels, a pair of shafts extending transversely of the machine adjacent said beam at an upward and inward slope from their lower ends, said ends of the shafts being adjacent but ahead of said wheels, means rotatably mounting the shafts in connection with said beam, brush engaging arms secured to and projecting rearwardly from said ends of the shafts, said arms having a lower end portion normally engaging and upstanding from the ground at a point ahead and laterally out from the point of ground contact of the adjacent wheel, and means to control the rotation of said shafts.

5. Brush diverting apparatus for a shredding machine which includes a frame disposed above and for movement along the ground, a pair of transversely spaced wheels supporting the front of the frame and adapted to straddle a row of brush, and brush shredding mechanism mounted on the frame rearwardly of said wheels; said diverting apparatus comprising a cross beam mounted in connection with the frame ahead of said wheels, a pair of shafts extending transversely of the machine adjacent said beam at an upward and inward slope from their lower ends, said ends of the shafts being adjacent but ahead of said wheels, means rotatably mounting the shafts in connection with said beam, brush engaging arms secured to and projecting rearwardly from said ends of the shafts, said arms having a lower end portion normally engaging and upstanding from the ground at a point ahead and laterally out from the point of ground contact of the adjacent wheel, and means to control the rotation of said shafts; said last named means comprising a substantially radial lever secured on each shaft, tension spring elements connected to said levers and urging them in a direction to rotate the shafts so as to maintain the arms in ground engagement and manually controlled pull elements connected to said levers to move the same in the opposite direction.

6. Apparatus as in claim 4 in which said shaft mounting means comprises attachment plates on the ends of said beam, matching plates to which said shafts are secured, said matching plates being vertically adjustably secured to said attachment plates, and a cross member connecting said matching plates together as a unit.

7. Brush diverting apparatus for a shredding machine which includes a frame disposed above and for movement along the ground, a pair of transversely spaced wheels supporting the front of the frame and adapted to straddle a row of brush, and brush shredding mechanism mounted on the frame rearwardly of said wheels; said diverting apparatus comprising a horizontal cross beam mounted in connection with the frame ahead of the wheels, attachment plates mounted on the ends of said beam, matching plates secured in vertically adjustable relation to the attachment plates, said latter plates being upstanding and projecting above and below the cross beam, a cross rod connecting said matching plates above the cross beam, elongated sleeves rigidly secured at their lower ends to corresponding ends of the matching plates and extending at an upward and inward slope therefrom, shafts rotatable in said sleeves and projecting from the ends thereof, brush engaging arms secured to and projecting rearwardly from the lower ends of the shafts, said arms having a lower end portion normally engaging and upstanding from the ground at a point ahead and laterally out from the point of ground contact of corresponding wheels, and means to control rotation of said shafts.

8. Brush diverting apparatus for a shredding machine which includes a frame disposed above and for movement along the ground, a pair of transversely spaced wheels supporting the front of the frame and adapted to straddle a row of brush, and brush shredding mechanism mounted on the frame rearwardly of said wheels; said diverting apparatus comprising a horizontal cross beam mounted in connection with the frame ahead of the wheels, attachment plates mounted on the ends of said beam, matching plates secured in vertically adjustable relation to the attachment plates, said latter plates being upstanding and projecting above and below the cross beam, a cross rod connecting said matching plates above the cross beam, elongated sleeves rigidly secured at their lower ends to corresponding ends of the matching plates and extending at an upward and inward slope therefrom, shafts rotatable in said sleeves and projecting from the ends thereof, brush engaging arms secured to and projecting rearwardly from the lower ends of the shafts, said arms having a lower end portion normally engaging and upstanding from the ground at a point ahead and laterally out from the point of ground contact of corresponding wheels, and means to control rotation of said shafts; said shaft control means comprising radial levers on the upper ends of said shafts, tension spring elements connected between said levers and the cross beam, said spring elements tending to rotate the shafts in a direction to urge the arms into ground engagement, a sleeve rotatable about the cross rod, radial levers fixed on and depending from said rotatable sleeve in corresponding relation to said shaft levers, pull elements connecting corresponding levers, said pull elements opposing the spring elements, and means to rotate the sleeve on the cross rod.

9. Brush diverting means for a shredding machine which includes a frame disposed above and for movement along the ground, a pair of transversely spaced wheels supporting the front of the frame and adapted to straddle a row of brush, and brush shredding means carried by the frame to the rear of the wheels; such brush diverting means comprising an arm supported by the frame in a substantially upstanding position from the ground at a point laterally out from a wheel and so located forwardly with respect to the wheel that brush lying transversely across the line of travel of the wheel and arm and to a point laterally out from the machine will be engaged and held to the ground by the wheel and rotated about the arm as a fulcrum to turn the brush from such position laterally out from the machine to a position between the wheels in line with the shredder.

10. A device as in claim 9 in which the arm at its upper end curves forwardly to the point of support from the frame.

11. A device as in claim 9 and including in combination therewith means to lift the arm from its operative position adjacent the ground to an inoperative position clear of the ground.

12. Brush diverting means for a shredding machine which includes a frame disposed above and for movement along the ground, a pair of transversely spaced wheels supporting the front of the frame and adapted to straddle a row of brush, and brush shredding means carried by the frame to the rear of the wheels; such brush diverting means comprising an arm supported on the frame at a point forwardly of a wheel and within the path of the forward travel of the wheel, such arm then curving rearwardly and downwardly to a point adjacent the ground laterally out from the plane of the outer face of the wheel and a predetermined distance from the wheel whereby with the forward movement of the machine, brush lying transversely across the line of travel of the wheel and arm and to a point laterally out from the machine will be engaged and held to the ground by the wheel and rotated about the arm as a fulcrum to turn the brush from such position laterally out from the machine to a position between the wheels in line with the shredder.

JESSE T. FIESE.